(12) United States Patent
Brieskorn et al.

(10) Patent No.: US 11,585,050 B2
(45) Date of Patent: Feb. 21, 2023

(54) PAVER HAVING ELEVATION PROFILE MONITORING EQUIPMENT AND METHODS FOR OPERATION THEREOF

(71) Applicant: Wirtgen GmbH, Windhagen (DE)

(72) Inventors: Jens Brieskorn, Bonn (DE); Lothar Schwalbach, Asbach (DE); Stefan Wagner, Bad Honnef (DE); Bernd Walterscheid, Sankt Augustin OT Buisdorf (DE); Gunnar Ramseger, Borod (DE); Martin Dahm, Gieleroth (DE)

(73) Assignee: Wirtgen GmbH

( * ) Notice: Subject to any disclaimer, the term of this patent is extended or adjusted under 35 U.S.C. 154(b) by 299 days.

(21) Appl. No.: 16/797,564

(22) Filed: Feb. 21, 2020

(65) Prior Publication Data

US 2020/0270823 A1    Aug. 27, 2020

(30) Foreign Application Priority Data

Feb. 26, 2019   (DE) ..................... 10 2019 104 850.8

(51) Int. Cl.
| | | |
|---|---|---|
| *E01C 19/48* | (2006.01) | |
| *B60R 1/00* | (2022.01) | |
| *E01C 23/01* | (2006.01) | |

(52) U.S. Cl.
CPC ............ *E01C 19/4893* (2013.01); *B60R 1/00* (2013.01); *E01C 23/01* (2013.01); *B60R 2300/80* (2013.01)

(58) Field of Classification Search
CPC ....... E01C 19/4893; E01C 23/01; B60R 1/00; B60R 2300/80

(Continued)

(56) References Cited

U.S. PATENT DOCUMENTS

| | | | |
|---|---|---|---|
| 4,012,160 A | * | 3/1977 | Parker ................ E01C 19/4873 404/84.05 |
| 4,943,119 A | | 7/1990 | Zarniko et al. |

(Continued)

FOREIGN PATENT DOCUMENTS

| | | |
|---|---|---|
| CN | 1149899 A | 5/1997 |
| CN | 1643220 A | 7/2005 |

(Continued)

OTHER PUBLICATIONS

European examination report for corresponding EP 20 15 7764, dated Jul. 24, 2020, 10 pages (not prior art).

*Primary Examiner* — Raymond W Addie
(74) *Attorney, Agent, or Firm* — Gary L. Monte; Lucian Wayne Beavers; Patterson Intellectual Property Law, PC

(57) ABSTRACT

A paver, in particular a slipform paver, has a machine frame supported by front and rear undercarriages and a paving device for the paving of material. The paver is provided with an apron monitoring device for generating elevation profile data or elevation profile signals describing the elevation profile of the material deposited in the apron of the paving device in a direction transverse to the working direction. A data or signal processing device receives the elevation profile data or signals. The apron monitoring device provides the data needed to allow the material to be spread more evenly across the working width of the paver during the feeding operation by means of a spreading device for spreading the material to be paved in a direction transverse to the working direction and/or to allow the spreading device to be controlled for improved spreading of the material after the paver has been fed.

21 Claims, 7 Drawing Sheets

(58) Field of Classification Search
USPC .................. 404/72, 75, 84.05–84.8, 118
See application file for complete search history.

(56) References Cited

U.S. PATENT DOCUMENTS

| | | | |
|---|---|---|---|
| 5,309,407 | A | 5/1994 | Sehr et al. |
| 5,575,583 | A | 11/1996 | Grembowicz et al. |
| 5,893,677 | A | 4/1999 | Haehn et al. |
| 6,371,566 | B1 | 4/2002 | Haehn |
| 7,172,363 | B2 | 2/2007 | Olson et al. |
| 7,510,347 | B2 | 3/2009 | Lemke |
| 7,689,351 | B2 | 3/2010 | McCain |
| 7,753,619 | B2 | 7/2010 | Guntert et al. |
| 7,984,953 | B2 | 7/2011 | Gaertner et al. |
| 8,047,741 | B2 | 11/2011 | Schonebeck et al. |
| 8,128,177 | B2 | 3/2012 | Wenzenbach et al. |
| 8,246,270 | B2 | 8/2012 | Berning et al. |
| 8,292,371 | B2 | 10/2012 | Wenzenbach et al. |
| 8,386,196 | B2 | 2/2013 | Wagner et al. |
| 8,424,972 | B2 | 4/2013 | Berning et al. |
| 8,456,290 | B2 | 6/2013 | Kido |
| 8,632,132 | B2 | 1/2014 | Wenzenbach et al. |
| 8,668,274 | B2 | 3/2014 | Gaertner et al. |
| 8,672,581 | B2 | 3/2014 | Berning et al. |
| 8,747,022 | B1* | 6/2014 | Case .............. E01C 19/48  404/118 |
| 8,807,867 | B2 | 8/2014 | Berning et al. |
| 8,855,967 | B1* | 10/2014 | Brenner .......... E01C 19/006  702/158 |
| 8,931,974 | B2* | 1/2015 | Herzberg ........ E01C 19/00  340/426.15 |
| 8,979,423 | B2* | 3/2015 | Smieja ........... E01C 19/48  404/72 |
| 9,121,146 | B2 | 9/2015 | Paulsen et al. |
| 9,290,894 | B2 | 3/2016 | Eul |
| 9,523,176 | B2 | 12/2016 | Berning et al. |
| 2005/0207841 | A1 | 9/2005 | Holl et al. |
| 2006/0039757 | A1 | 2/2006 | Lemke |
| 2006/0045620 | A1* | 3/2006 | Olson .............. E01C 19/006  404/101 |
| 2008/0038059 | A1* | 2/2008 | Frelich ............ E01C 23/07  404/75 |
| 2008/0153402 | A1 | 6/2008 | Arcona et al. |
| 2010/0178107 | A1* | 7/2010 | Braddy ........... E01C 23/01  404/108 |
| 2010/0283598 | A1* | 11/2010 | King .............. E01C 19/48  340/472 |
| 2011/0123268 | A1* | 5/2011 | Berning .......... B60Q 1/50  404/90 |
| 2012/0221300 | A1 | 8/2012 | Tukora |
| 2012/0288328 | A1* | 11/2012 | Minich ........... E01C 19/48  404/72 |
| 2012/0299702 | A1 | 11/2012 | Edara et al. |
| 2012/0301220 | A1 | 11/2012 | Snoeck et al. |
| 2013/0002412 | A1 | 1/2013 | Kido |
| 2013/0051913 | A1 | 2/2013 | Eul |
| 2013/0128279 | A1 | 5/2013 | Wachsmann et al. |
| 2013/0197820 | A1 | 8/2013 | Wagner et al. |
| 2013/0290071 | A1 | 10/2013 | Speirs et al. |
| 2013/0300838 | A1 | 11/2013 | Borowski |
| 2014/0191560 | A1 | 7/2014 | Gaertner et al. |
| 2014/0244208 | A1 | 8/2014 | Paulsen et al. |
| 2017/0030036 | A1* | 2/2017 | Buschmann ...... E01F 9/518 |
| 2018/0340302 | A1 | 11/2018 | Menzenbach et al. |

FOREIGN PATENT DOCUMENTS

| | | |
|---|---|---|
| CN | 1737264 A | 2/2006 |
| CN | 101205699 A | 6/2008 |
| CN | 102953312 A | 3/2013 |
| CN | 203546576 U | 4/2014 |
| DE | 9204614 U1 | 7/1992 |
| DE | 9204614 U1 | 8/1992 |
| DE | 19756676 C1 | 6/1999 |
| DE | 102006010793 A1 | 10/2006 |
| DE | 102007044090 A1 | 4/2009 |
| DE | 102008023743 A1 | 11/2009 |
| DE | 102008045470 A1 | 3/2010 |
| DE | 102010004785 A1 | 5/2011 |
| DE | 102011101944 A1 | 11/2012 |
| DE | 102015009699 A1 | 2/2016 |
| EP | 1916645 A1 | 4/2008 |
| EP | 2119832 A1 | 11/2009 |
| EP | 3260603 A1 | 12/2017 |
| EP | 3406799 A1 | 11/2018 |
| JP | 01271504 A | 10/1989 |
| JP | 09125700 A | 5/1997 |
| JP | 10030919 A | 2/1998 |
| JP | 2000194983 A | 7/2000 |
| JP | 2000319815 A | 11/2000 |
| JP | 3172404 B2 | 6/2001 |
| JP | 2002350116 A | 12/2002 |
| JP | 2008163734 A | 7/2008 |
| JP | 2009545689 A | 12/2009 |
| JP | 2011163111 A | 8/2011 |
| JP | 2011226265 A | 11/2011 |
| WO | 2012155904 A2 | 11/2012 |
| WO | 2012168186 A1 | 12/2012 |

\* cited by examiner

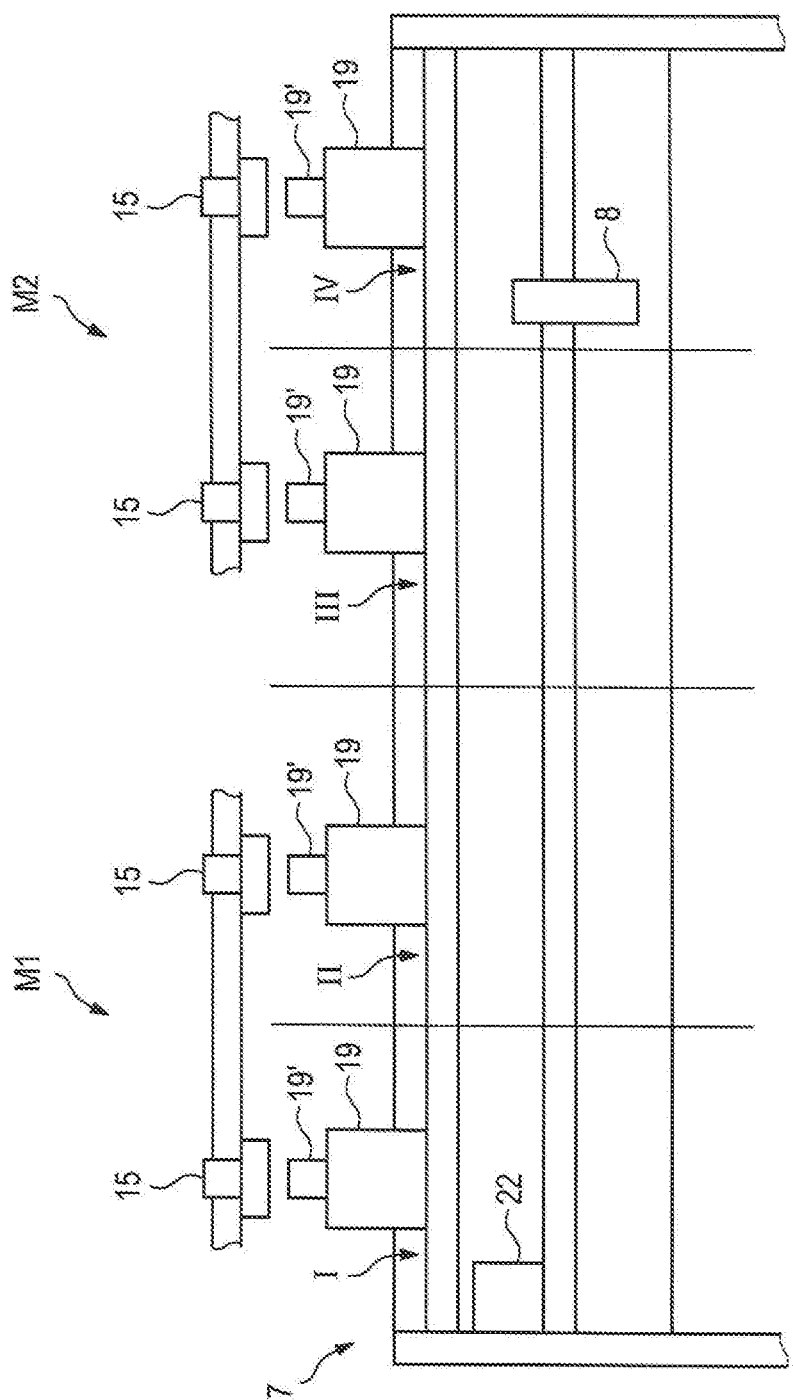

PAVER HAVING ELEVATION PROFILE MONITORING EQUIPMENT AND METHODS FOR OPERATION THEREOF

CROSS-REFERENCES TO RELATED APPLICATIONS

This application claims benefit of German Patent Application No. 10 2019 104 850.8, filed Feb. 26, 2019, and which is hereby incorporated by reference.

BACKGROUND

The invention relates to a paver, in particular a slipform paver, having a machine frame supported by undercarriages and a paving device for the paving of material. Additionally, the invention relates to a method for operating such a paver.

Pavers are used for paving unbound and bound layers, such as asphalt or concrete. Slipform pavers equipped with a slipform are used for paving concrete surfaces.

The known slipform pavers permit particularly economical concrete paving. The concrete to be paved is deposited directly in front of the slipform paver or conveyed from the side to the paver via a conveyor belt. The slipform paver can be equipped with a spreading device, such as a spreading plough or a spreading auger, to spread the concrete evenly over the entire pave width. After spreading, the concrete is homogeneously compacted with electric or hydraulic vibrators. The slipform then moulds the concrete surface during forward travel to a defined width and thickness.

Slipform pavers are disclosed, for example, in DE 10 2011 101 944 A1, DE 10 2006 010 793 A1 and WO 2012/155904 A2.

In practice, there is a problem with evenly distributing a sufficient quantity of material for paving, such as concrete, across the working direction of the paver. In general, the material is unloaded from the side in front of the paver using a digger or delivered by a lorry and tipped in the working direction in front of the paver. It cannot be avoided that individual accumulations form, so that the material has to be evenly distributed over the entire working width. Although the spreading plough of the slipform paver can spread the material evenly, the aim is to deposit the material transversely to the working direction in front of the paver in a spread which is as even as possible. However, this is not easily possible in practice, as the region is not visible or is only poorly visible, in particular to the machine operator of the digger, but also to the driver of the lorry. In addition, a sufficient volume of material must be available at all times.

BRIEF SUMMARY

An object of the invention is to create a paver that simplifies the paving process and, in particular, to facilitate the feeding of the material to be paved. Another object of the invention is to improve the spreading of the material to be paved over the entire working width.

These objects are achieved according to the invention by the features of the independent claims. The subject matter of the dependent claims relates to advantageous embodiments of the invention.

The paver according to the invention, in particular a slipform paver, has an apron monitoring device which is configured in such a way that elevation profile data or elevation profile signals are generated which describe the height profile of the material deposited in the apron of the paving device in a direction transverse to the working direction. In addition, the paver has a data or signal processing device receiving the elevation profile data or elevation profile signals which allows processing of the elevation profile data or elevation profile signals.

In this context, data or signals are all the items of information obtained by measuring which describe the elevation profile. The elevation profile data or elevation profile signals can be analogue or digital measurements that can be used for further evaluation.

A data or signal processing device is a device which allows processing of the data or signals (measurements) obtained with the apron monitoring device. The data or signal processing device can comprise analogue or digital circuits and can be a separate device or a part of a central computing and control device of the paver. For example, the data or signal processing device can have a generic processor, a digital signal processor (DSP) for continuous editing of digital signals, a microprocessor, an application-specific integrated circuit (ASIC), an integrated circuit consisting of logic members (FPGA), or other integrated circuits (IC) or hardware components. A data processing program (software) can be run on the hardware components. A combination of the various components is also possible.

The elevation profile describes the spreading of the material in a direction transverse to the working direction. In this context, an elevation profile can not only be understood as a vertical section through the accumulation or accumulations of material in the apron of the paving device running transversely to the working direction, i.e. the lateral expansion (width) of the accumulations of material, but the elevation profile data or elevation profile signals can also describe the spreading of the material in the working direction. The elevation profile data or elevation profile signals can therefore describe an image of the accumulations along a transverse line or strip, or the entire volume or partial volumes of the accumulations.

The elevation profile can be determined in relation to a reference point on the paver, in particular relative to the top edge of the concrete trough. For the determination of the elevation profile relative to the reference point, the apron monitoring device, or the sensor system thereof which monitors the elevation profile, can be attached to the machine frame in a defined position. Alternatively, the elevation profile can be determined relative to the substrate. For this purpose, it can be necessary to know the machine configuration and the orientation of the paver relative to the substrate, in particular the positions of the lifting columns or information from a levelling system. These data are usually available in the machine controller. Determining the elevation profile relative to the substrate has the advantage that the concrete volume actually deposited in front of the paver can be determined.

The apron monitoring device provides the data which, while the paver is being fed, allow the material to be spread more evenly across the working width of the paver and/or allow a control of the spreading device for an improved spread of the material after the feeding of the paver.

An embodiment of the invention provides that the data or signal processing device is configured to determine from the elevation profile data or elevation profile signals volume data which describe the volume of the material deposited in front of the paving device. This volume data may then be subjected to further data or signal processing in the data or signal processing device. If the volume of the deposited material is known, it is possible to calculate how long the volume will last. If the volume is insufficient, the feed rate of the paver can be reduced or the paver can be stopped. If the volume of the material to be paved is known, the material requirements can also be determined.

A particularly preferred embodiment provides that the data or signal processing device is configured in such a way that, from the elevation profile data or elevation profile signals and from data describing a given nominal elevation, portions of the elevation profile are determined in which the elevation of the material is equal to or greater than the nominal elevation, and/or portions of the elevation profile are determined in which the elevation of the material is less than the nominal elevation. In this way, the elevation of individual accumulations in front the paving device can be determined. The data describing the nominal elevation therefore provide insight into in which regions material still has to be deposited and/or into which regions material has to be transported.

The data describing the specified nominal elevation can, in the simplest case, only define a single value for the nominal elevation. For the decision as to whether the elevation of a material accumulation is sufficient or not, a plurality of elevation values can also be specified, for example to form an average value that indicates the elevation of the material accumulation in a determined region.

The data describing the nominal elevation can be values that can be specified, or can be determined automatically, for example a nominal elevation. The paver can have an input device with which the nominal elevation can be entered manually. The nominal elevation depends in particular on the paving elevation, the paving width, the paving speed and the material properties of the material to be paved. The data or signal processing device may be configured in such a way that the data describing the specified nominal elevation are automatically determined on the basis of the paving elevation and/or the paving width and/or the paving speed and/or the material properties of the material to be paved, which are entered using the input device.

The paver preferably has a display and/or signalling device cooperating with the data or signal processing device and configured in such a way that symbols and/or signals characteristic of the elevation profile are displayed or output. For example, the display and/or signalling device can be used to display the volume of the deposited material. The display and/or signalling device may also emit an (alarm) signal, such as a visual or an acoustic alarm signal, when the volume exceeds or falls below a specified value, in particular the volume required for paving.

The display and/or signalling device can have one or a plurality of display and/or signalling members, such as screens, optical, acoustic or tactile signal generators. The display and/or signalling members can be provided on the machine frame of the paver and/or on a portable unit, in particular on a tablet, or on another paver in a group of pavers. The display and/or signalling members on the machine frame should preferably be clearly visible within the field of vision of the lorry driver, i.e. the surface of the display and/or signalling members should be in a plane transverse to the working direction and point in the working direction.

A particularly preferred embodiment provides that the display and/or signalling device is configured in such a way that, for a portion in which the elevation of the material is less than the nominal elevation, a first symbol and/or signal is displayed or output, and for a portion in which the elevation of the material is greater than the nominal elevation, a second symbol and/or signal is displayed or output. This embodiment provides the machine operator of the digger or the lorry driver with the information required for the most even feeding possible.

Another aspect of the invention is not the visualisation of the feeding process, but the control of the spreading process by means of the apron monitoring device. The spreading of the material in a direction transverse to the working direction is carried out by a spreading device which is arranged in front of the paving device in the working direction.

For controlling the spreading operation, the paver has a control device cooperating with the data or signal processing device, the control device being configured in such a way that the spreading device is controlled in such a way that material is transported from a portion in which the elevation of the material is greater than the nominal elevation to a portion in which the elevation of the material is less than the nominal elevation, so that the material is spread as evenly as possible over the entire working width of the paver. The control can be based on algorithms that make possible a particularly fast and efficient spreading of the material. The spreading of the material can be carried out with the known spreading devices.

In a preferred embodiment, the automatic spreading of the material is carried out by a spreading device, which has a spreading member movable transversely to the working direction, also known as a spreading plough. The spreading member can be lifted from a lower position to an upper position and lowered from an upper position to a lower position so that an accumulation of material can be traversed or the material can be pushed to either side. The spreading device is formed in such a way that the position data describing the position of the spreading member are generated and can be evaluated by the control device.

The data or signal processing device is configured in such a way that it is determined whether a portion in which the elevation of the material is greater than the desired elevation is on the left or right side of a portion in which the elevation of the material is less than the desired elevation. The control of the spreading member depends on whether the portion in which the elevation of the material is greater than the nominal elevation is on the left or right side of the portion in which the elevation of the material is less than the nominal elevation, and whether the spreading member is on the left or right side of the portion in which the elevation of the material is greater than the nominal elevation. On the basis of the elevation profile data or elevation profile signals obtained with the apron monitoring device and the position data of the control device, the spreading member is either lowered or raised and moved to the left or right in order to detect the excess of material and transport it to the region where there is a shortage of material.

However, the spreading of the material can also be carried out with the known spreading augers. If the spreading device has a plurality of spreading augers, for example a left and a right spreading auger, one or the other spreading auger can be controlled depending on the spreading of the material in order to spread the material evenly over the entire working width.

The apron monitoring device preferably has a distance measuring system configured in such a way that the distance is measured between at least one reference point related to the machine frame and the surface of the material.

In one embodiment, the distance measuring system of the apron monitoring device has a plurality of distance sensors distributed transversely to the working direction, in particular laser sensors, ultrasonic sensors, inductive or capacitive distance sensors, which are each assigned to a specific portion of the elevation profile. As a result, the entire working width of the paver is divided into a plurality of portions, each of which is monitored by one or a plurality of distance sensors.

The distance sensors are formed in such a way that the distance is measured between a reference point related to the machine frame and the surface of the material located in the portion to which the distance sensor is associated. Each distance sensor can be used to make a point measurement or a measurement with respect to a specific region of the surface of the accumulated material. However, the distance measuring system can also have only one distance sensor.

Instead of or in addition to one or a plurality of conventional distance sensors, measuring can also be carried out with a distance measuring system which has one or a plurality of camera systems, wherein the camera system is designed in such a way that the range for individual pixels in the captured image is calculated. Such prior art camera systems measure distances with a transit time method. The apron is illuminated by light pulses and the time needed for the light to return to the camera is measured for the pixels. The ranges are then calculated from the transit times. The elevation profile data or elevation profile signals in this embodiment thus describe a three-dimensional image of the material accumulations and allow the measurement thereof so that their volume and/or spread can be determined. These camera systems are described as TOF cameras (time of flight). The distance measuring system can have one or a plurality of TOF cameras recording at least one part of the apron of the spreading device.

In principle, any desired techniques for determining ranges or distances can be used, e.g. 3D or stereo cameras.

The apron monitoring device with the distance measuring system can form a structural unit. For example, the distance sensors or camera systems may be mounted on a frame arranged in front of the spreading device in the working direction. An embodiment provides that the apron monitoring device comprises a plurality of modular units each having one or a plurality of distance sensors distributed across the working direction or one or a plurality of camera systems distributed across the working direction. With such a modular construction of the apron monitoring device, an adaptation to the different working widths of the pavers is possible, wherein the number of modules used is determined by the working width of the paver.

In addition, a documentation of the paving process, for example of the volume of the paved concrete, can be carried out with the apron monitoring device. This is important insofar as the volume of concrete deposited in front of the paver differs from the volume of concrete already paved, as the concrete is compacted during paving. Thus, for example, a degree of compaction can be assumed and/or a forecast of the concrete requirement needed for future phases of construction can be made.

BRIEF DESCRIPTION OF THE SEVERAL VIEWS OF THE DRAWINGS

An embodiment according to the invention is explained in more detail below with reference to the drawings.

In which:

FIG. 6 is an apron monitoring device consisting of a plurality of modular units.

DETAILED DESCRIPTION

Figure 1:
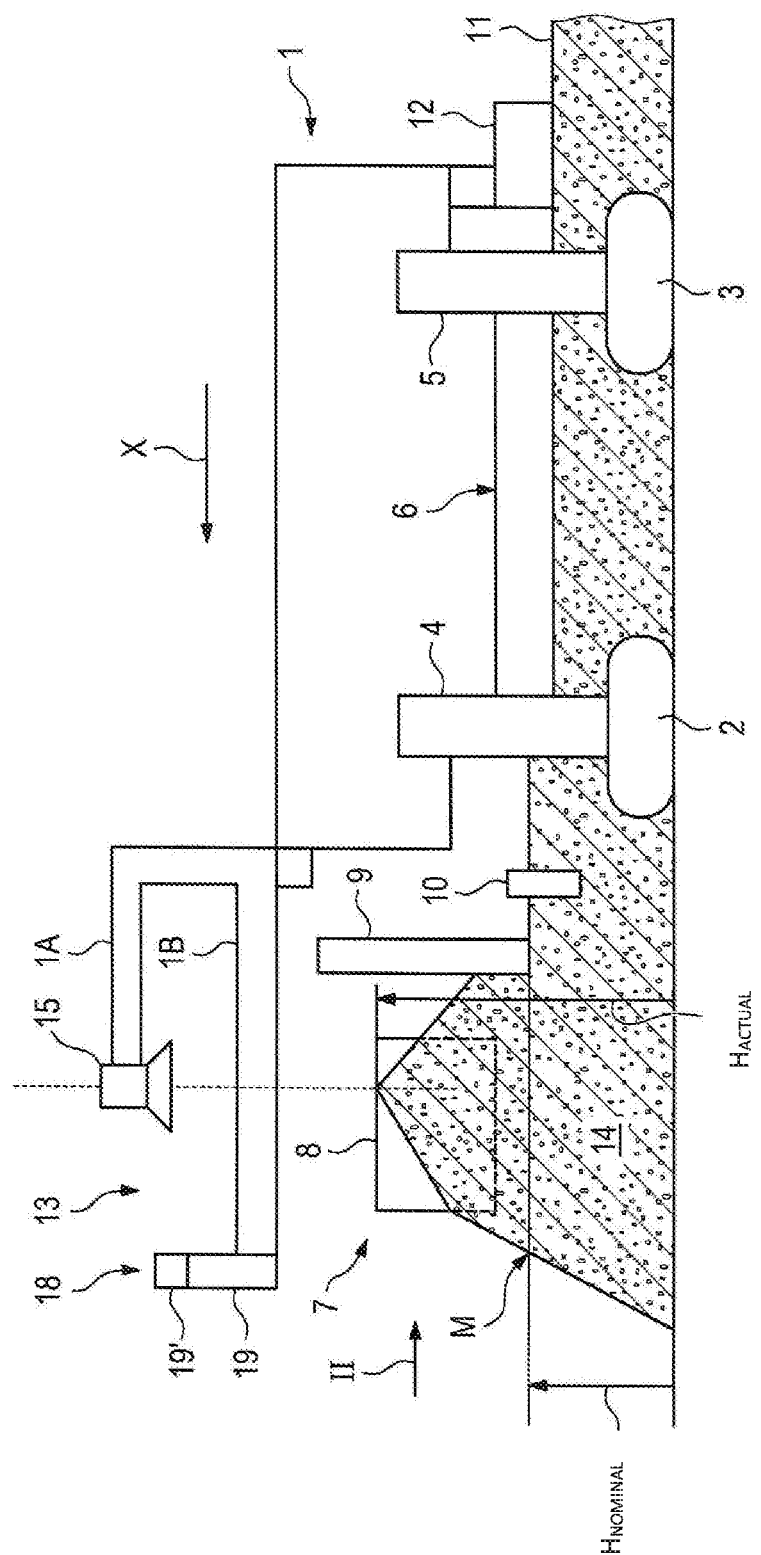
FIG. 1 is a side view of a highly simplified schematic representation of a slipform paver.
Figure 2:
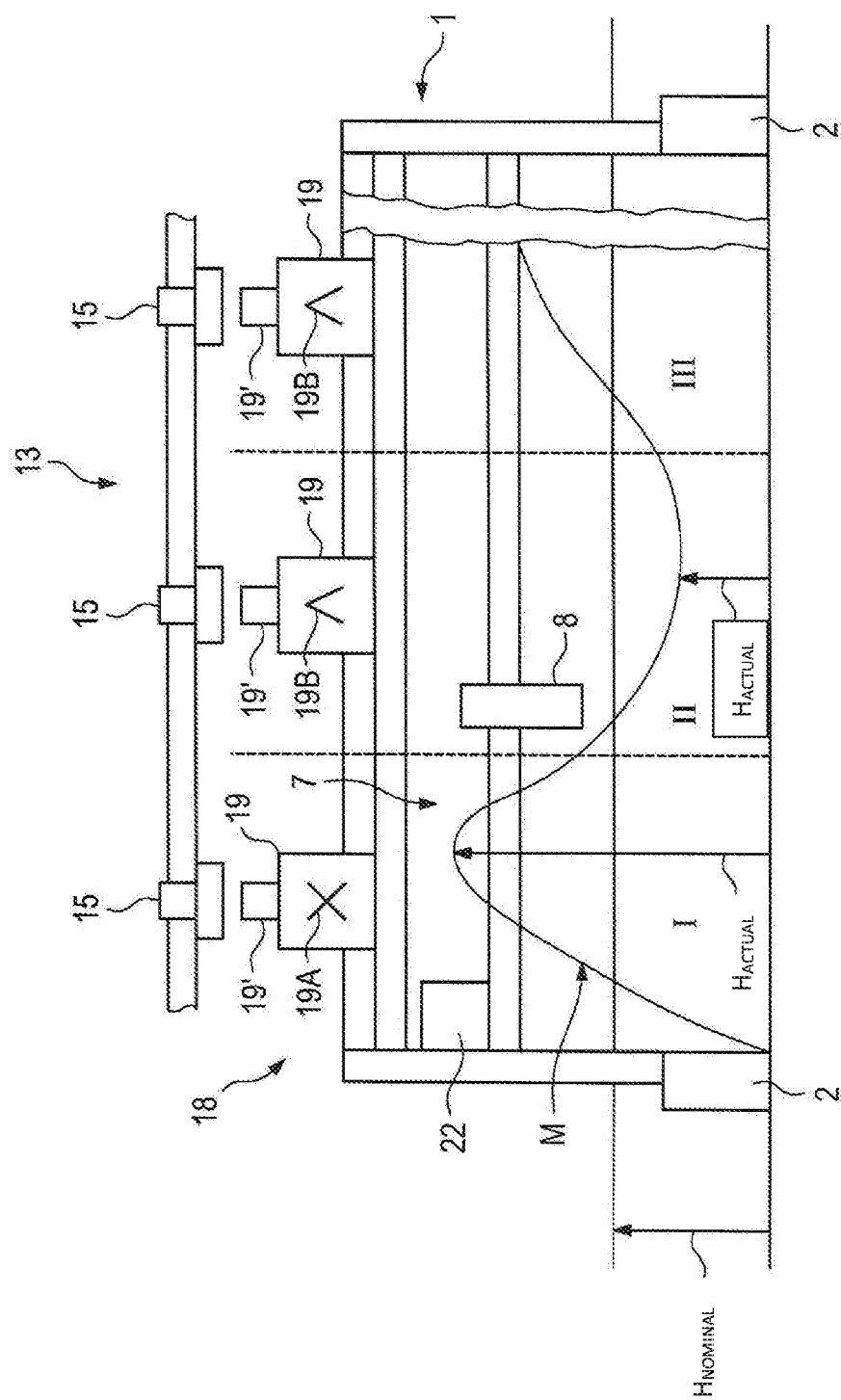
FIG. 2 is a view of the slipform paver from the direction of arrow II of FIG. 1.

FIG. 1 shows the side view and FIG. 2 the front view of a slipform paver as an example of a paver in a highly simplified schematic representation, wherein only the assemblies essential for the invention are shown. The slipform paver has a machine frame 1 supported by two elevation-adjustable front undercarriages 2 and two elevation-adjustable rear undercarriages 3. The front and rear undercarriages 2, 3 are attached to the machine frame 1 by means of front and rear lifting columns 4, 5 in the working direction X so that the machine frame 1 can be raised or lowered. Between the undercarriages 2, 3 there is a working device shown only in outline in the form of a slipform 6, which is arranged on the machine frame.

The material M (concrete) to be paved is deposited in front of the slipform paver in working direction X. In practice, when the material is deposited, a plurality of accumulations of concrete are formed spread over the working width. FIG. 1 shows a section through an accumulation of material.

The slipform paver is equipped with a spreading device 7, which has a spreading member 8 that can be moved transversely to the working direction in order to spread the concrete evenly across the entire working width. To adjust the elevation of the concrete to be paved, the slipform paver is equipped with a scraping member 9 extending transversely to the working direction. In the working direction X behind the scraping member 9 there are vibrators 10 for compacting the concrete.

FIG. 1 shows the surface of the concrete in the working direction X in front of and behind the scraping member 9 as well as the surface of the concrete track 11 behind the slipform 6. The surface of the concrete is smoothed with a smoothing device 12 arranged behind the slipform 6.

The slipform paver is equipped with an apron monitoring device 13 for monitoring the region of the site 14 (apron) on which the material to be paved (concrete) is deposited. The apron monitoring device 13 comprises a distance measuring system which has a plurality of distance sensors or camera systems 15 which are arranged transversely to the working direction X of the slipform paver, preferably at constant distances. In the present exemplary embodiment, the slipform paver has a total of six distance sensors or camera systems 15 across the entire working width. FIG. 2 shows only three distance sensors or camera systems 15 in a schematic diagram. The number of distance sensors or camera systems 15 is determined by the coverage of the sensors or systems and the working width of the slipform paver, which is preferably adjustable. For example, only two or three distance sensors or camera systems 15 can also be provided. However, monitoring of the apron 14 of the slipform paver is also possible with just one camera system.

The distance sensors measure the distance between a reference point related to the machine frame 1 and the surface of the material M. From the specified paving elevation or the lifting positions of the lifting columns, the elevation of the reference point related to the machine frame 1 relative to the surface of the site can be determined, wherein from the elevation of the reference point, in turn, the elevation $H_{ACTUAL}$ of the material M relative to the ground can be calculated.

In the present exemplary embodiment, the distance measuring system of the apron monitoring device 13 has a plurality of TOF camera systems 15 attached to a boom 1A of the machine frame 1. The camera systems 15 each have an illumination unit (not shown) to illuminate the apron 14, a lens to collect the light reflected from the environment and a TOF sensor that measures the transit time for each pixel, as well as an interface for outputting data. TOF camera systems belong to the prior art.

In addition, the apron monitoring device 13 has a data or signal processing device 16. In the present exemplary embodiment, a data processing device 16 is provided for processing the data of the TOF camera systems 15. The data processing device 16 is configured in such a way that, from the data which are read out from the TOF camera systems 15, elevation profile data are generated which describe the elevation profile of the material M deposited in the apron of the spreading device 7 in a direction running transversely to the working direction X.

The TOF camera systems 15 are assigned to specific portions in which the elevation of the deposited material is monitored. In the present embodiment, the working width is divided into six portions, wherein only three portions I, II, III are shown in FIG. 2. The data processing device 16 determines the elevation H of the accumulated material in the individual portions from the data of the TOF camera systems. A plurality of camera systems 15 or distance sensors can also be assigned to a portion. The evaluation of the data can be based on known algorithms. For example, an average value can be formed from the data of the camera systems or distance sensors assigned to a portion.

In the present exemplary embodiment, for each of the six portions, the data processing device 16 determines a value for the elevation H, such as the maximum elevation, of the material in the respective portion. These values are stored in a memory 16A of the data processing device 16.

The apron monitoring device 13 also has an input device 17, for example a keyboard 17A or a touch screen. With the input device 17, the machine operator of the slipform paver can manually enter a nominal elevation $H_{NOMINAL}$, which is stored in the memory 16A of the data processing device 16.

The data processing device 16 is configured in such a way that the elevation values $H_{ACUTAL}$ assigned to the individual portions are compared with a nominal elevation $H_{NOMINAL}$. If the elevation of the material is less than the nominal elevation, an insufficient quantity of material is assumed in the relevant portion, and if the elevation of the material is equal to or greater than the nominal elevation, an adequate quantity of material is assumed. In FIG. 1 or FIG. 2, the given nominal elevation $H_{NOMINAL}$ and the actual elevation $H_{ACTUAL}$ of the material M are marked.

In addition, the apron monitoring device 13 has a display or signalling device 18 which has a number of display or signalling members 19 corresponding to the number of portions. In the present exemplary embodiment, six display members 19 are provided which, in the present exemplary embodiment, are display panels attached to a boom 1B of the machine frame 1.

The display or signalling members 19 are arranged in the field of vision of the lorry driver, who tips the material in front of the slipform paver, transversely to the working direction X. The display or signalling members 19 can be attached to parts of the machine frame 1.

Figure 3:
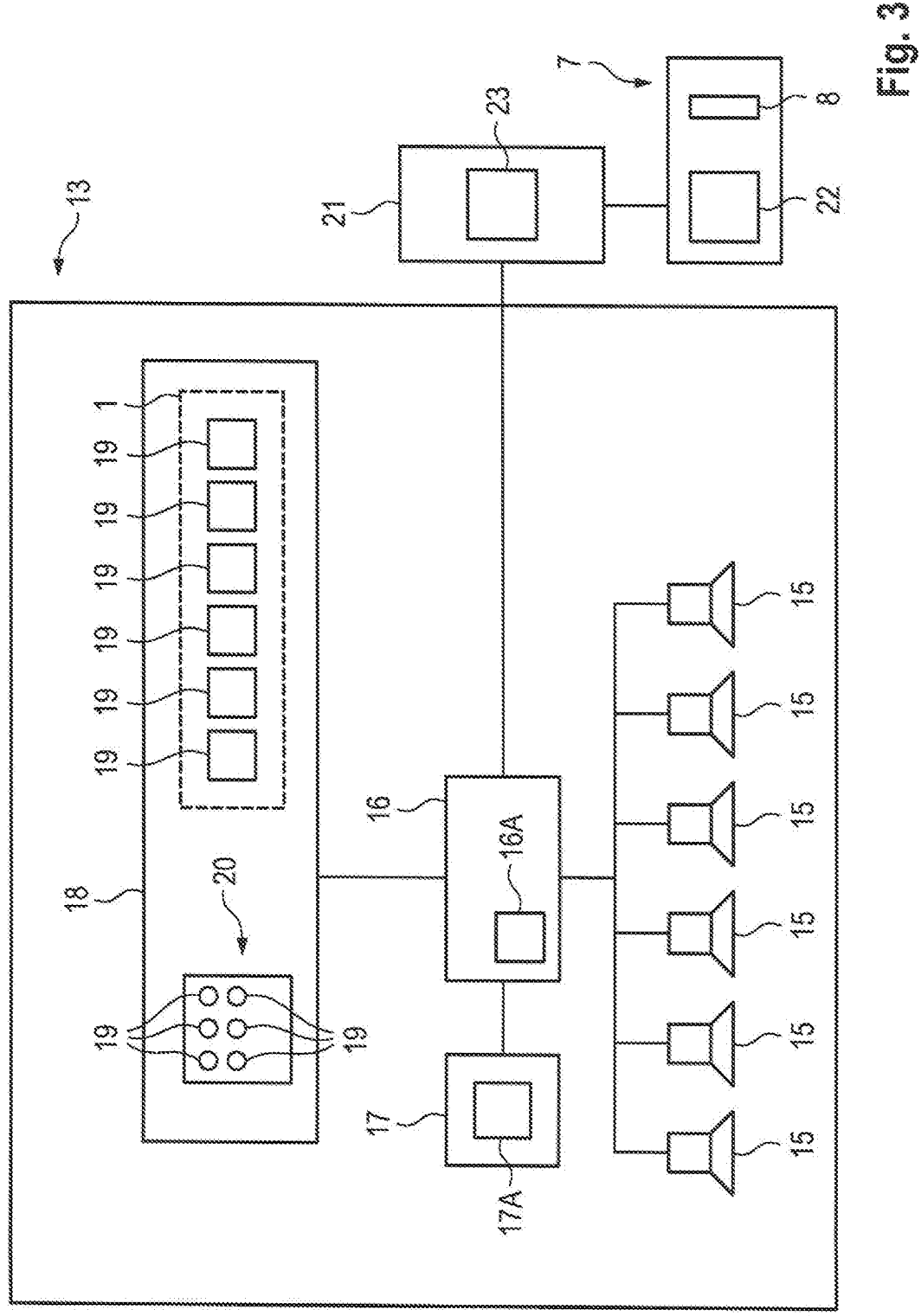
FIG. 3 is a block diagram with the camera systems and the data or signal processing device and the display device as well as the input device and the control device of the spreading device.

However, the display or signalling device 18 may also have display or signalling members 19 which are not provided on the slipform paver. The display members or signalling members can also be provided on a portable display or signalling unit 20. In the present exemplary embodiment, an additional display or signalling unit 20 in the form of a tablet is provided, on whose screen the display members 19 are displayed, and which can have a signalling member 19, for example a loudspeaker (FIG. 3).

The portable display unit 20 communicates with the data processing device 16 via a wired or wireless connection, e.g. via WLAN or data transmission according to the Bluetooth standard. The portable display unit 20 can also replace the display panels on the slipform paver.

The display or signalling device 18 displays a first symbol 19A, for example a cross, for a portion I in which the elevation $H_{ACTUAL}$ of the material is greater than or equal to the nominal elevation $H_{NOMINAL}$, and a second symbol 19B, for example an arrow pointing upwards, for a portion II, III in which the elevation of the material is less than the nominal elevation. The symbols 19A, 19B can have a certain colour. For example, the cross can be displayed with an array of green light-emitting diodes and the arrow with an array of red light-emitting diodes. The red arrow signals to the driver of the lorry that further material is to be tipped in the relevant portion. The green cross signals that there is sufficient material in the portion. As a result, feeding of the slipform paver is facilitated.

One embodiment provides that the display or signalling device 18 not only displays or signals whether there is sufficient material in the relevant portion, but also displays the elevation of the material, for example the elevation in cm. It is also possible to calculate and display the value by which the nominal elevation $H_{NOMINAL}$ is reduced and/or exceeded. In these exemplary embodiments, additional alphanumeric display members 19' are provided. However, only alphanumeric display of the material elevations can be carried out.

The TOF camera systems 15 permit a three-dimensional measuring of the material deposited in the apron of the slipform paver. A further embodiment provides that data processing device 16 is configured in such a way that volume data describing the volume of material deposited in front of the spreading device 7 are determined from the elevation profile data. Said volume data are displayed on the display device 18. For example, the material volume is calculated separately for each portion, and on alphanumeric display members 19', the volumes of the material are displayed separately for each portion. Another embodiment provides that the total volume is calculated and displayed using the display device 18.

The data processing device 16 can be part of the central control and computing device 21 of the slipform paver or form a separate unit which cooperates with the central control and computing device 21 of the slipform paver. The total volume determined can be used as a basis for further evaluation in the data processing device 16 or the control and computing device 21. The slipform paver can be controlled on the basis of the data determined in this manner.

An embodiment provides that the data processing device 16 is configured in such a way that it is calculated whether the existing volume of material (quantity of material) is sufficient for a certain period of time. In addition, or as an alternative, the data processing device can also calculate the quantity of material still to be deposited for that period.

A further embodiment does not provide for a manual entry of a nominal value for the elevation of the material to be deposited, but for an automatic determination of the nominal elevation. In this embodiment, the input device 17 is designed in such a way that the paving elevation and/or the paving width and/or the paving speed and/or the material properties of the material to be paved can be entered. The data processing device 16 is configured in such a way that the nominal elevation $H_{NOMINAL}$ is calculated on the basis of the paving elevation and/or the paving width and/or the paving speed and/or the material properties of the material to be paved, which are entered using the input device 17.

The following describes another aspect of the invention that is of independent inventive significance, i.e. it does not require the display described above and can also be used instead of the display.

The spreading device 7 of the slipform paver has a drive device 22 shown only schematically in FIG. 2, which is designed in such a way that the spreading member 8 can be moved transversely to the working direction X over the entire working width and can be raised from a lower position and lowered from an upper position. Instead of only one spreading plough, a plurality of spreading members 8 can also be provided, which can be moved horizontally and vertically by the drive device 22. The drive device 22 generates position data describing the position of the spreading member. The position data can be coordinates in a Cartesian coordinate system.

A control device 23, which cooperates with the data processing device 16, is provided for controlling the drive device 22 of the spreading device 7. The control device 23, which can be part of the central control and computing device 21 of the slipform paver, controls the drive device 22 of the spreading device 7 in such a way that the material is transported from a portion in which the elevation of the material is greater than the nominal elevation to a portion in which the elevation of the material is less than the nominal elevation, so that the material is spread over the entire working width of the paver. The control device 23 may also be implemented and referred to herein as a "controller."

Figure 4:
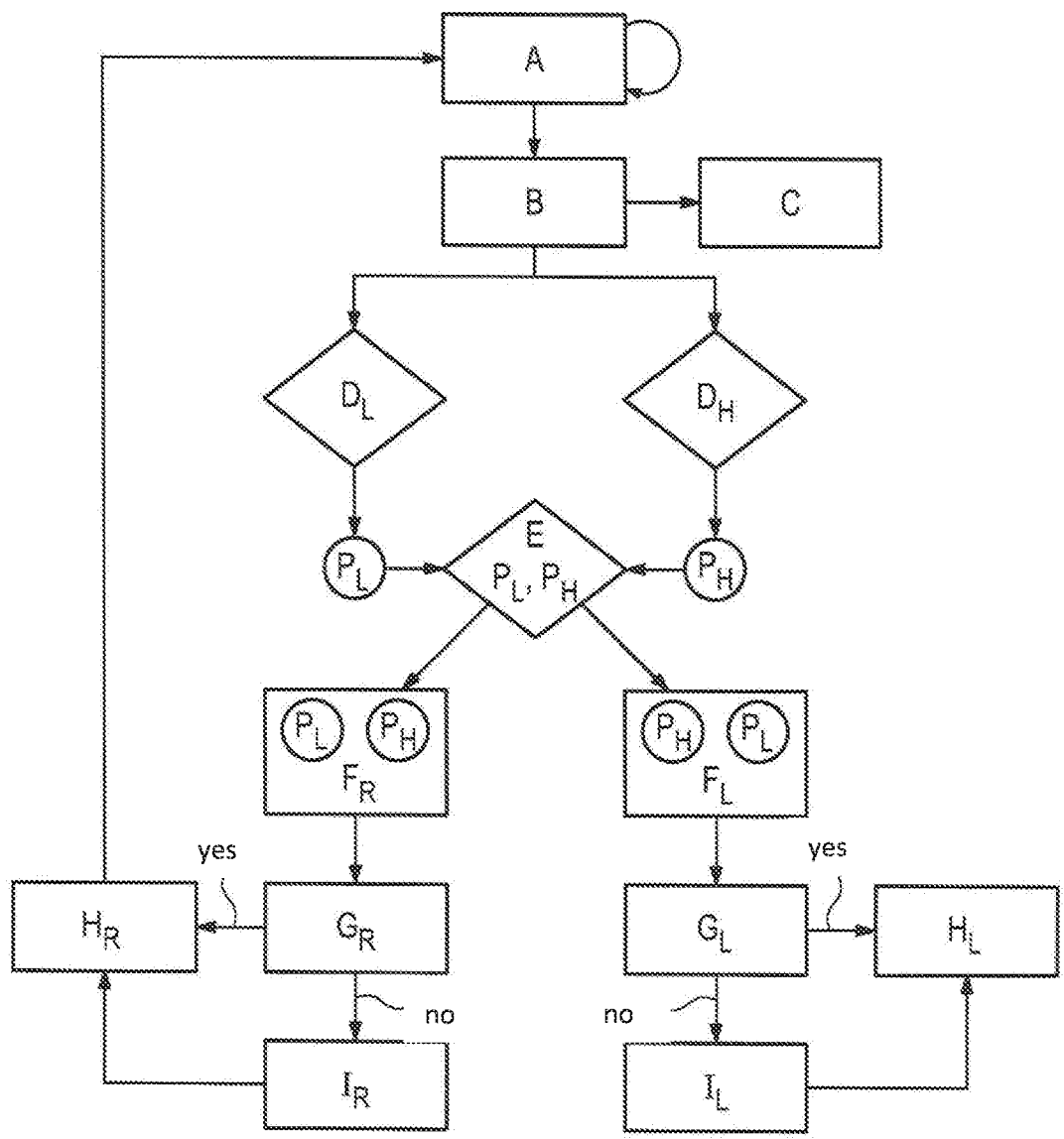
FIG. 4 is a flow chart for illustration of the control of the drive device of the spreading device.
Figure 5A:
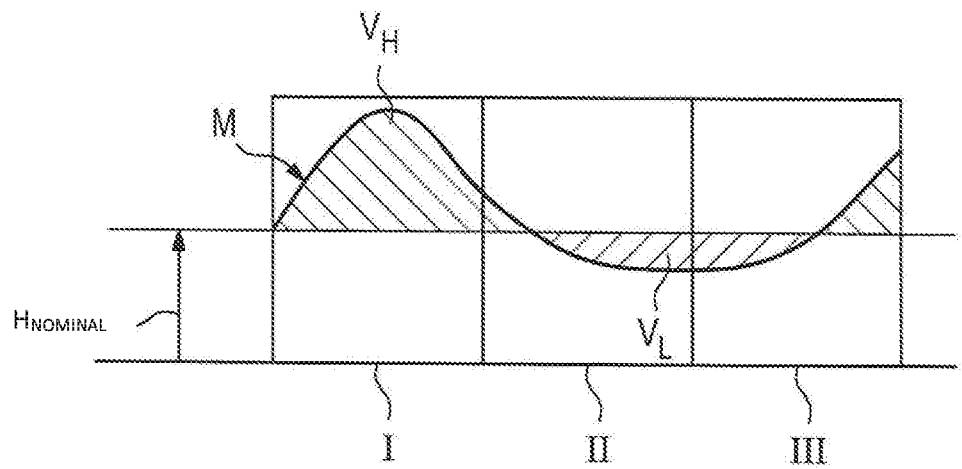
FIG. 5A and FIG. 5B are schematic illustrations of the material accumulations for illustration of the individual method steps of FIG. 4.
Figure 5B:
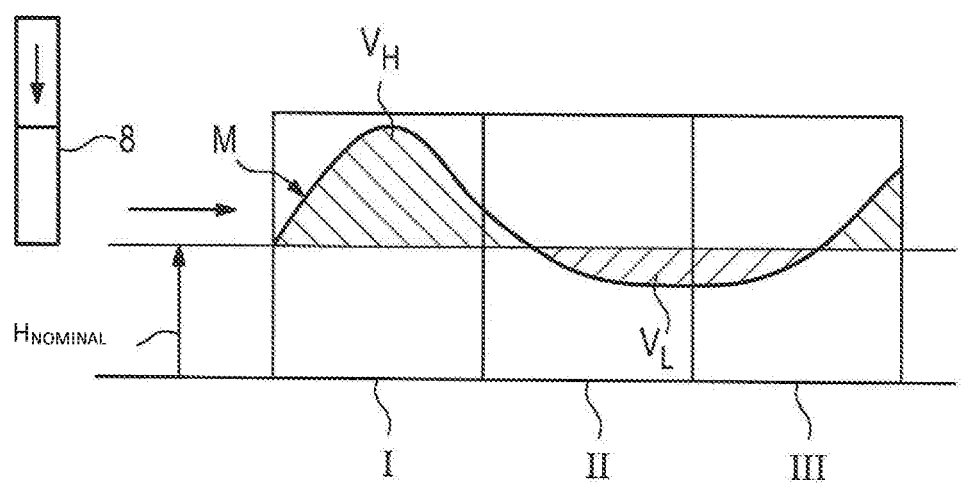

The individual steps performed by the data processing device 16 and the control device 23 to control the spreading member 8 of the spreading device 7 are described in the following with reference to FIG. 4 and FIGS. 5A and 5B. FIG. 4 shows a flow chart with the individual method steps and FIGS. 5A and 5B are schematic representations of the material accumulations in the individual portions I, II, III in the apron 14 of the spreading device 7 for illustration of the individual method steps.

The data processing device 16, which receives the elevation profile data of the apron monitoring device 13 and the position data of the drive device 22 of the spreading device 7, continuously checks whether sufficient material is present in each portion I, II, III by comparing the actual elevation $H_{ACTUAL}$ of each accumulation of material in a portion I, II, III with the nominal elevation $H_{NOMINAL}$. If $H_{ACTUAL}$ is greater than or equal to $H_{NOMINAL}$, it is assumed that sufficient material is present (FIG. 4: step A). FIG. 5A shows the case that there is sufficient material in portion I and insufficient material in portions II and III.

If there is not enough material in a portion, the total volume $V_H$ of the material is determined in the apron of the slipform paver which is above the nominal elevation $H_{NOMINAL}$, and the total volume $V_L$ of the material which is below the nominal elevation $H_{NOMINAL}$, is determined. If the difference between $V_H$ and $V_L$ is greater than a specified threshold value, then it is concluded that sufficient material is present (step B). An exact determination of the volumes based on the elevation profile data is not required. In practice, a rough estimate of the volumes is sufficient. If the volume is not sufficient, i.e. the difference between $V_H$ and $V_L$ is smaller than a specified threshold value, a corresponding display is made or a corresponding signal is output. For example, the display and signalling device 18 gives an audible or visual alarm (step C). FIG. 5A shows the case that $V_H$ is larger than $V_L$ and the total volume is sufficient for an even spread.

Now it is determined in which portion $P_H$ there is a sufficient volume of material, i.e. whether the ACTUAL elevation $H_{ACUTAL}$ is greater than the NOMINAL elevation $H_{NOMINAL}$, and in which portion $P_L$ there is an insufficient volume of material, i.e. whether the ACTUAL elevation $H_{ACTUAL}$ is less than or equal to the NOMINAL elevation $H_{NOMINAL}$ (step DL and step DH). Thereupon the relative position of the portions $P_L$ or $P_H$ with or without sufficient volume of material is determined (step E). It is determined whether a portion $P_H$ in which the elevation of the material is greater than the nominal elevation $H_{NOMINAL}$, i.e. the volume is sufficient, is on the left side (step $F_L$) or on the right side (step $F_R$) of the portion $P_L$ in which the elevation of the material is less than the nominal elevation, i.e. the volume is insufficient.

In FIGS. 5A and 5B, the portion I corresponds to the portion $P_H$ in which the elevation of the material is greater than the nominal elevation $H_{NOMINAL}$, and the portion II corresponds to the portion $P_L$ in which the elevation of the material is less than the nominal elevation $H_{NOMINAL}$.

If the portion $P_H$ in which the elevation of the material is greater than the nominal elevation $H_{NOMINAL}$, lies on the left side of the portion $P_L$ in which the elevation of the material is less than the nominal elevation (step $F_L$), and the spreading member 8 is on the left side of the portion $P_H$ in which the elevation of the material is greater than the nominal elevation (step $G_L$), the control device 23 lowers the spreading member 8 and moves the spreading member 7 to the right side of the portion $P_L$ in which the elevation of the material is less than the nominal elevation (step $H_L$). In FIG. 5B, the movement of the spreading member is shown by arrows.

If the portion $P_H$ in which the elevation of the material is greater than the nominal elevation $H_{NOMINAL}$ lies on the left side of the portion $P_L$ in which the elevation of the material is less than the nominal elevation (step $G_L$), and the spreading member 8 is on the right side of the portion, in which the elevation of the material is greater than the nominal elevation, the control device 23 first moves the spreading member 8 in an elevated state to the left side of the portion $P_H$ in which the elevation of the material is greater than the nominal elevation (step IL), i.e. to the position indicated in FIG. 5B, then lowers the spreading member 8 and moves the spreading member to the right side of the portion $P_L$ in which the elevation of the material is less than the nominal elevation (step $H_L$).

In a similar way, the drive device 22 of the spreading device 7 is controlled when the portion $P_H$ in which the elevation of the material is greater than the nominal elevation $H_{NOMINAL}$ is on the right side of the portion $P_L$ in which the elevation of the material is less than the nominal elevation (steps $F_R$, $G_R$, $H_R$, $I_R$).

If the portion $P_H$, in which the elevation of the material is greater than the nominal elevation $H_{NOMINAL}$, is on the right side of the portion $P_L$, in which the elevation of the material is less than the nominal elevation (step $F_R$), and the spreading member 8 is on the right side of the portion $P_H$, in which the elevation of the material is greater than the nominal elevation (step $G_R$), the control device 23 lowers the spreading member from 8 and moves the spreading member to the left side of the portion $P_L$ in which the elevation of the material is less than the nominal elevation (step $H_R$).

If the portion $P_H$ in which the elevation of the material is greater than the nominal elevation $H_{NOMINAL}$ lies on the right side of the portion $P_L$ in which the elevation of the material is less than the nominal elevation (step $F_R$), and the spreading member 8 is on the left side of the portion $P_H$ in which the elevation of the material is greater than the nominal elevation (step $G_R$), the control device 23 first moves the spreading member 8 in an elevated state to the right side of the portion $P_H$ in which the elevation of the material is greater than the nominal elevation (step $I_R$), then lowers the spreading member and moves the spreading member to the left side of the portion $P_L$ in which the elevation of the material is less than the nominal elevation (step $H_R$).

FIG. 6 shows an apron monitoring device 13 consisting of a plurality of modular units M1, M2. In the present exemplary embodiment, each modular unit M1 or M2 has two distance sensors or camera systems 15, which are each assigned to a portion I, II, III, IV. Two modular units M1, M2 are used for the double working width, which can be arranged next to each other on the machine frame 1 and connected to each other by means of a wired or wireless connection (not shown), in order to be able to transfer the data between the units. For the triple working width, for example, three modular units are used. The modular units may be electrically connected to the data processing device 16 by means of a wired or wireless connection (not shown) so that the data can be transferred. The modular units can have a common display or signalling unit or have their own display or signalling units. All modular units can be used for the control of the spreading device. The modular construction allows universal use of the apron monitoring device 13.

Figure 7:
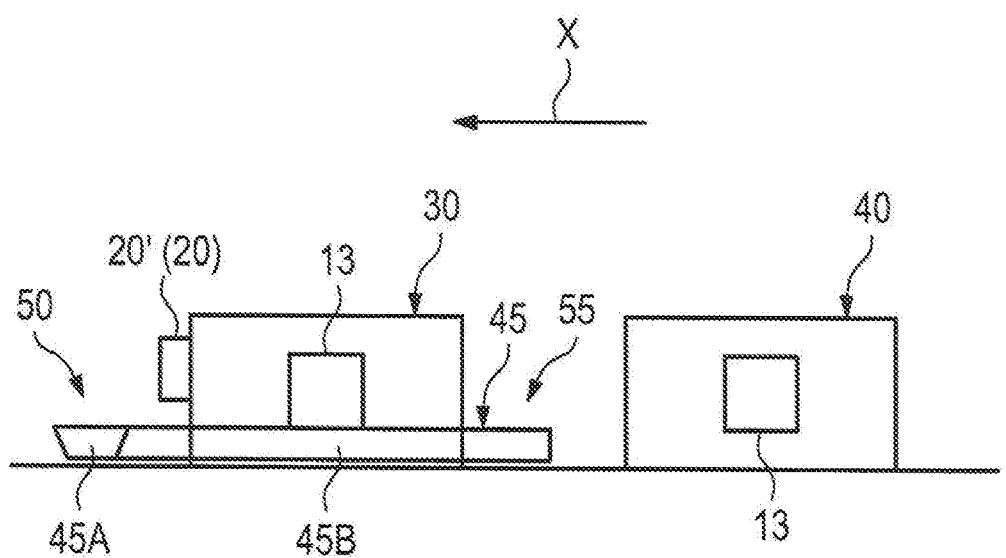
FIG. 7 is a paving train in a highly simplified schematic representation.

A paving train for a two-layer concrete paving is described in the following with reference to FIG. 7. FIG. 7 shows the paving train in a highly simplified schematic representation. The paving train comprises a preceding bottom-layer concrete paver 30 that paves the lower layer and a top-layer concrete paver 40 that follows the bottom-layer concrete paver 30 and paves the upper layer. Feeding of the top-layer concrete paver 40 is carried out in the apron 50 of the bottom-layer concrete paver 30. For feeding the top-layer concrete paver 40, there is an additional feeding point in the working direction X in front of the bottom-layer concrete paver 30. A conveying device 45 is provided for this purpose, which has a chute 45A, into which the material is deposited by a digger or a lorry, and a belt conveyor 45B, with which the material is conveyed against the working direction X into the apron 55 of the top-layer concrete paver 40.

At least the subsequent slipform paver 40 (top-layer concrete paver) is a slipform paver equipped with the apron monitoring device 13 described with reference to FIGS. 1 to 6. On the paving train, the display and signalling device 18 (FIGS. 1 to 6) has a display or signalling unit 20' which is located in the field of vision of the machine operator of the digger or driver of the lorry, for example in the region of the front side of the bottom-layer concrete paver 30. The display or signalling unit 20' can also be designed as a mobile display unit, for example in the driver's cab of the digger or lorry. If the bottom-layer concrete paver 30 also has an apron monitoring device 13, the display or signalling unit 20' can be the display or signalling unit 20 of the apron monitoring device 13 of the bottom-layer concrete paver 30.

The apron monitoring device 13 of the top-layer concrete paver 40 continuously monitors the volume of the material in the apron 55. The apron monitoring device 13 is configured in such a way that the elevation profile data or signals are used to determine the volume data describing the volume of material deposited in the front of the spreading device 7 of the top-layer concrete paver 40. These volume data are then subjected to further data or signal processing in the data or signal processing device 16 in order to determine whether a sufficient amount of material is present. If the volume is not sufficient, this is indicated by the display or signalling unit 20', which the driver of the lorry can easily recognise, or a signal is output by the display or signalling unit 20'. Alternatively or additionally, intervention in the machine control of the top-layer concrete paver 40 and/or bottom-layer concrete paver 30 can also be carried out.

What is claimed is:

1. A paver comprising:
   a machine frame supported by at least one undercarriage;
   a paving device configured for the paving of material;
   a spreading device configured to spread material to be paved in a direction running transversely to the working direction, the spreading device being arranged in the working direction in front of the paving device;
   one or more sensors attached to the machine frame in a defined position, wherein the one or more sensors are configured to generate elevation profile data or elevation profile signals which describe the elevation profile of material deposited by a material depositing vehicle in front of the spreading device in the direction running transversely to a working direction, wherein the material depositing vehicle is independent of the paver;
   a data or signal processor configured to receive and process the elevation profile data or elevation profile signals; and
   a display and/or signalling device which cooperates with the data or signal processor and having one or more display and/or signalling members provided on the machine frame,
   wherein a surface of at least one of the display and/or signalling members is positioned in a plane transverse to the working direction and oriented in the working direction to be visible to an operator of the material depositing vehicle,
   wherein the display and/or signalling device is configured to at least convey, via the at least one of the display and/or signalling members, at least one characteristic of the elevation profile relative to a nominal elevation.

2. The paver of claim 1, wherein:
   the data or signal processor is configured to determine volume data describing a volume of the material deposited in front of the paving device from the elevation profile data or elevation profile signals.

3. The paver of claim 1, wherein:
   the data or signal processor is configured to determine portions of the elevation profile in which an elevation of the material is less than, equal to, or greater than a nominal elevation, from the elevation profile data or signals and further data describing a predetermined nominal elevation.

4. The paver of claim 3, further comprising:
   an input device functionally linked to the data or signal processor, wherein the data or signal processor is configured to determine the data describing the predetermined nominal elevation based on one or more of:
the paving elevation;
a paving width;
a paving speed; and
material properties of the material to be paved, which are entered using the input device.

5. The paver of claim 1, wherein:
the display and/or signalling device is configured to display or output symbols and/or signals characteristic of the elevation profile.

6. The paver of claim 5, wherein:
the display and/or signalling device further comprises one or more display and/or signalling members on a mobile computing device.

7. The paver of claim 5, wherein the display and/or signalling device is configured to display or output one or more of:
a first symbol for a portion in which the elevation of the material is less than the nominal elevation;
a first signal for a portion in which the elevation of the material is less than the nominal elevation;
a second symbol for a portion in which the elevation of the material is greater than the nominal elevation; and
a second signal for a portion in which the elevation of the material is greater than the nominal elevation.

8. The paver of claim 3, further comprising:
a controller comprising or functionally linked with the data or signal processor, the controller configured to control the spreading device to transport material from a portion in which the elevation of the material is greater than the nominal elevation into a portion in which the elevation of the material is less than the nominal elevation.

9. The paver of claim 8, wherein:
the spreading device comprises a spreading member movable transversely to the working direction, which can be raised from a lower position into an upper position and lowered from an upper position into a lower position, and
the spreading device generates position data describing the position of the spreading member.

10. The paver of claim 9, wherein:
the data or signal processor is configured to determine whether a portion in which the elevation of the material is greater than the nominal elevation lies on a left or right side of a portion in which the elevation of the material is less than the nominal elevation,
when the portion in which the elevation of the material is greater than the nominal elevation lies on the left side of the portion in which the elevation of the material is less than the nominal elevation and the spreading member is on the left side of the portion in which the elevation of the material is greater than the nominal elevation, the controller is configured in such a way that the spreading member is lowered and moved to the right side of the portion in which the elevation of the material is less than the nominal elevation,
when the portion in which the elevation of the material is greater than the nominal elevation is on the left side of the portion in which the elevation of the material is less than the nominal elevation, and the spreading member is located on the right side of the portion in which the elevation of the material is greater than the nominal elevation, the controller is configured in such a way that the spreading member is first directed to the left side of the portion in which the elevation of the material is greater than the nominal elevation, and then the spreading member is lowered and moved to the right side of the portion in which the elevation of the material is less than the nominal elevation,
when the portion in which the elevation of the material is greater than the nominal elevation is on the right side of the portion in which the elevation of the material is less than the nominal elevation, and the spreading member is located on the right side of the portion in which the elevation of the material is greater than the nominal elevation, the controller is configured in such a way that the spreading member is lowered and moved to the left side of the portion in which the elevation of the material is less than the nominal elevation, and
when the portion in which the elevation of the material is greater than the nominal elevation is on the right side of the portion in which the elevation of the material is less than the nominal elevation and the spreading member is on the left side of the portion in which the elevation of the material is greater than the nominal elevation, the controller is configured in such a way that the spreading member is first moved to the right side of the portion in which the elevation of the material is greater than the nominal elevation and then the spreading member is lowered and moved to the left side of the portion in which the elevation of the material is less than the nominal elevation.

11. The paver of claim 1, wherein:
the one or more sensors comprise one or more distance measuring sensors configured to measure a distance between at least one reference point related to the machine frame and a surface of the material.

12. The paver of claim 11, wherein:
the one or more distance measuring sensors comprise one or more of:
a laser sensor;
an ultrasonic sensor; and
an inductive or capacitive distance sensor,
the one or more distance measuring sensors arranged distributed transversely to the working direction,
each of the one or more distance measuring sensors associated with a particular portion of the elevation profile,
wherein the one or more distance measuring sensors are configured to measure the distance between a reference point related to the machine frame and the surface of the material located in the portion to which the distance sensor is associated.

13. The paver of claim 11, wherein the one or more distance measuring sensors comprise one or more camera systems configured to:
record at least a part of a working area in front of the spreading device in the direction running transversely to the working direction, and
calculate a range for individual pixels in the recorded image.

14. The paver of claim 1, wherein:
the one or more sensors comprises a plurality of modular units, each having:
one or a plurality of distance measuring sensors distributed across the working direction, or
one or a plurality of camera systems distributed across the working direction.

15. A method for operating a paver which has a machine frame supported by one or more undercarriages, a paving device for the paving of material and a spreading device for spreading the material to be paved in a direction running transversely to the working direction, the spreading device being arranged upstream of the paving device in the working direction, the method comprising:
- generating elevation profile data or signals corresponding to an elevation profile of material deposited by a material depositing vehicle upstream of the spreading device in a direction running transversely to the working direction, wherein the material depositing vehicle is independent of the paver; and
- displaying at least one characteristic of the elevation profile relative to a nominal elevation, via one or more display and/or signalling members provided on the machine frame, wherein a surface of at least one of the display and/or signalling members is positioned in a plane transverse to the working direction and oriented in the working direction to be visible to an operator of the material depositing vehicle.

16. The method of claim 15, further comprising:
determining volume data corresponding to a volume of the material deposited in front of the spreading device from the elevation profile data or elevation profile signals.

17. The method of claim 15, further comprising:
determining portions of the elevation profile, in which the elevation of the material is less than, equal to, or greater than a nominal elevation from the elevation profile data or signals and data describing a predetermined nominal elevation.

18. The method of claim 17, wherein:
the data describing the predetermined nominal elevation are determined based on one or more of:
- a paving elevation;
- a paving width;
- a paving speed; and
- material properties of the material to be paved.

19. The method of claim 15, further comprising:
displaying or outputting symbols and/or signals which are characteristic of the elevation profile.

20. The method of claim 19, wherein:
a first symbol and/or signal is displayed or output for a portion in which the elevation of the material is less than a nominal elevation, and
a second symbol and/or signal is displayed or output for a portion in which the elevation of the material is greater than the nominal elevation.

21. The method of claim 17, further comprising:
automatically controlling the spreading device to transport material from a portion, in which the elevation of the material is greater than the nominal elevation, to a portion, in which the elevation of the material is less than the nominal elevation, so that the material is spread over the working width of the paver.

* * * * *